(12) United States Patent
Sharma et al.

(10) Patent No.: US 8,391,277 B2
(45) Date of Patent: Mar. 5, 2013

(54) INTEROPERABILITY OF LEGACY ALARM SYSTEM

(75) Inventors: Sandeep Sharma, Westminister, CO (US); Bernard McKibben, Broomfield, CO (US); Sumanth Channabasappa, Superior, CO (US); Eduardo Cardona, Broomfield, CO (US); Stuart Hoggan, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 837 days.

(21) Appl. No.: 12/542,773

(22) Filed: Aug. 18, 2009

(65) Prior Publication Data

US 2011/0044318 A1 Feb. 24, 2011

(51) Int. Cl.
*H04L 12/66* (2006.01)
(52) U.S. Cl. ......................................................... 370/352
(58) Field of Classification Search .................. None
See application file for complete search history.

(56) References Cited

U.S. PATENT DOCUMENTS

| | | | |
|---|---|---|---|
| 6,983,042 B1 | 1/2006 | Chapman, Jr. et al. | |
| 7,174,176 B1 * | 2/2007 | Liu | 455/462 |
| 7,397,907 B2 | 7/2008 | Petite | |
| 7,620,058 B2 * | 11/2009 | Gorti et al. | 370/401 |
| 2003/0101459 A1 * | 5/2003 | Edson | 725/82 |
| 2007/0211877 A1 * | 9/2007 | Martin et al. | 379/210.02 |
| 2007/0290830 A1 * | 12/2007 | Gurley | 340/506 |
| 2008/0224851 A1 | 9/2008 | Pumpelly et al. | |
| 2008/0304656 A1 | 12/2008 | Reed et al. | |
| 2009/0034414 A1 | 2/2009 | Schuette et al. | |
| 2009/0058630 A1 | 3/2009 | Friar et al. | |
| 2009/0059900 A1 * | 3/2009 | Abraham | 370/352 |

* cited by examiner

*Primary Examiner* — Phirin Sam
*Assistant Examiner* — Faiyazkhan Ghafoerkhan
(74) *Attorney, Agent, or Firm* — Brooks Kushman P.C.

(57) ABSTRACT

A base station and system configured to support interfacing digital and analog devices with a legacy alarm system in a manner that allows messages from the legacy alarm system to pre-empt other messaging, if needed, when the messaging takes place through the same gateway as that which is used by the legacy alarm system.

14 Claims, 3 Drawing Sheets

INTEROPERABILITY OF LEGACY ALARM SYSTEM

BACKGROUND OF THE INVENTION

1. Field of the Invention

The present invention relates to legacy alarm systems of the type that seizes a plain old telephone service (POTS) line in order to transmit an analog alarm message, and particularly, to providing interoperability between such legacy alarm systems and gateways used to interface cordless telephones with a telephony network.

2. Background Art

A home or other alarm system designed to protect a dwelling or other location is commonly configured to electronically transmit alarms and other messages to an alarm disposition center for processing. The alarm disposition center may interrogate the alarm message in order to assess the related alarm and the need to dispatch emergency response personnel, such as police, fire, or medical personnel. As more and more electronic devices are being used within the home, and more and more of the devices are being used to communicate messages and other signals over mediums used by the alarm systems, homeowners and the service providers relying on the in-home devices to support their services may find it difficult to support interoperability of the dissimilar devices. This is a particular problem when more than one of the devices rely on the same residential gateway as the alarm system to electronically communicate with wide area networks (WANs) or other locations outside the home.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompanying drawings in which:

DETAILED DESCRIPTION OF THE PREFERRED EMBODIMENT

Figure 1:
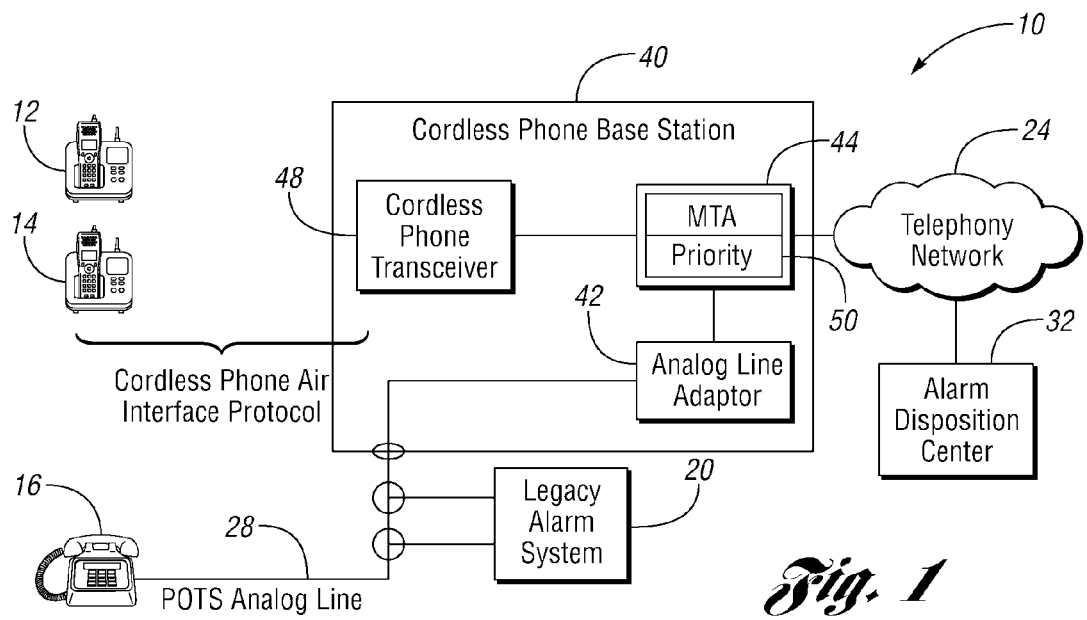
FIG. 1 illustrates a system configured in accordance with one non-limiting aspect of the present invention to support interoperability of devices found within a home secured by a legacy alarm system.

FIG. 1 illustrates a system 10 configured in accordance with one non-limiting aspect of the present invention to support interoperability of devices 12, 14, 16 found within a home (not shown) secured by a legacy alarm system 20. For exemplary purposes and without intending to limit the scope and contemplation of the present invention, the system 10 is predominately described with respect to the devices 12, 14, 16 being of the type used to support analog and digital telephone signaling exchanges over a telephony network 24, i.e., cordless, digital phone(s) 12, 14 and plain old telephone system (POTS), analog telephone 16. The telephony network 24 may be any wireless or wireline network used to support any type of circuit-switched or packet-switched communication, including those associated with interfacing analog/digital circuits or a VoIP protocol such as Session Initiation Protocol (SIP) or H.323.

For the purposes of the present invention, the legacy alarm system 20 may be defined as a type of alarm system that relies on seizing an analog telephone line 28 in order to transmit an alarm message to a remotely located alarm disposition center 32. The line seizures performed by the alarm system 20 may be mechanical in the sense that the seizure takes place without processing or otherwise assessing any activities already taking place over the telephone line 28, i.e., a legacy alarm system 20 may be unable to assess whether a phone call is already taking place over the telephone line 28 or whether some other activity has a greater priority or right to the telephone line 28. Consequently, the legacy alarm system 20 may be configured to simply seize the line 28 in a manner that preempts any other communications taking place on the line 28 from a location upstream of the alarm system 20, i.e., the POTS telephone 16. This may be an acceptable design constraint if it is assumed that any message transmitted from the alarm system 20 should have priority over any other communications.

In order to support the assumed superiority of the alarm system message, the alarm system 20 may be positioned downstream of any other communications devices, i.e., between the telephony network 24 and any other telephones, faxes, modems, etc 12, 14, 16. This type of arrangement is generally acceptable since the phone 16 or other devices (not shown) connected to the same telephone line 28 also operate according to analog signaling, therefore making it acceptable to connect the analog line dependent legacy alarm system 20 to the same line 28 or loop as the other devices 16. The use of digital devices 12, 14 and the benefits attendant to digital communications are resulting in more and more telephones, faxes, modems, etc. (peripheral devices) relying on digital based communications, including digital communications that enable Voice over Internet Protocol (VoIP) to occur with the telephony network 24.

VoIP, in particular, allows phone calls to take place over a packet-switched network and not just the circuit-switched network required for analog communications. Because some of devices, like the legacy alarm system 20 and analog telephone 16, may not be digitally compatible, a base station 40 may be included to house components and features suitable to interfacing the home devices 12, 14, 16, 20 with the telephone network 24. One such feature may be an analog line adaptor 42 configured to convert the analog signals from the analog devices 16, 20 into digital signals. An RJ-11 connector or other mechanism can be used to interface the analog devices 16, 20 with the analog line adaptor 42.

Since a simple conversion of the analog signaling to digital signaling may not be sufficient to support some digital communications, such as those required to support VoIP and other packet-switched operations, the base station 40 may include a multimedia terminal adaptor (MTA) 44. The MTA 44 may be configured to facilitate adaptation of the analog line signals in a manner that supports communications with VoIP and other digital/packet-switched telephony networks 24. The MTA 44 may be configured to perform conversions and other operations necessary to support VoIP and other packet-switched communications with the telephony network 24, including any necessary protocol conversions to support VoIP related communications. The MTA 44, operating in cooperation with the analog line adaptor 42, can be used to allow the legacy alarm system 20 and other analog devices 16 to execute VoIP calls and messaging.

In addition to interfacing the analog devices 16, 20 with the telephony network 24, the MTA 44 may also be configured to interface other digital devices, such as the cordless telephones 12, 14, with the telephony network 24. These digital devices 12, 14 can be connected directly (either physically or over the air) to the MTA 44 without the assistance of the analog line adaptor 42. The cordless telephones 12, 14, which may be configured to operate according to Digital Enhanced Cordless Telecommunications (DECT) standard, may rely on cordless communications with a cordless phone transceiver 48 included in the base station 40 to support exchange of cordless phone signaling with the MTA 44. Unlike the analog devices 16, 20 wherein analog signals must be converted to digital signals, the MTA 44 may communicate directly with the cordless phone transceiver 48 since the cordless phone transceiver 48 relies on digital signaling.

The cordless phone transceiver 48, MTA 44, and analog line adaptor 42 may be integrated within a single housing or package (not shown). The base station 40 can be advantageous in that it allows service providers to deliver a single piece of equipment to a customer to support digital and analog communications over the telephony network 24. This single piece of equipment, or housing, may be self-contained unit in that it includes an output port to exchange signals with the network 24 and input ports for exchanging signals with the devices 12, 14, 16, 20 in the home. Because cordless telephones 12, 14, or more particularly the cordless phone transceivers 48, are not connected through the analog line adaptor 42 to the MTA 44, the legacy alarm system 20 is not connected downstream of the cordless phones 12, 14. This prevents the legacy alarm system 20 from seizing/interrupting a cordless phone call in order to deliver an alarm message over the telephony network 24. The difficulty of supporting digital and analog phone calls over the same residential base station 40 as that used to support the legacy alarm system 20 is one type of interoperability provided by the present invention.

One non-limiting aspect of the present invention contemplates supporting the interoperability of the cordless telephone 12, 14 and the legacy alarm system 20 by associating a priority controller 50 with the MTA 44. The priority controller 50 may be a logically functioning element included with the MTA 44 to prioritize a need for the alarm system 20 to transmit an alarm message relative to a need to support a phone call or other signaling desired by other devices 12, 14, 16 connected to the base station 40. In this manner, the priority controller 50 can be configured to interrupt a cordless phone call serviced through the MTA 44 in favor of transmitting an alarm message from the alarm system 20. Without the priority controller 50 seizing, preempting, discontinuing or otherwise ending the cordless phone call, the attempt by the legacy alarm system 20 to transmit an alarm message while a cordless phone call is taking place may result in the alarm system 20 simply being bridged into the cordless phone call without a dial tone as if the alarm system 20 were another participant in the phone call.

The priority controller 50 may be configured to assess a priority level of an alarm message transmitted from the legacy alarm system 20 relative to other operations carried out by the base station 40. For example, if the priority controller 50 determines an emergency 911 call to be taking place over one of the cordless handsets 12, 14, it may prevent the legacy alarm system 20 from interrupting the cordless phone call. If the legacy alarm system 20 is configured to send periodic test messages or other non-emergency alarm messages, the priority controller 50 may be configured to prevent interruption of a cordless phone call in progress during that time. Optionally, if a cordless phone call is not already taking place but is begun during transmission of a lower priority alarm message, the priority controller may be configured to interrupt the legacy alarm system 20 in order to permit the cordless phone call. A priority schedule (not shown) may be embedded within priority controller 50 or otherwise in communication therewith to specify a priority hierarchy for any number of base station operations. Optionally, the priority hierarchy may be programmed by a user so as to allow use specific control of legacy alarm system interruptions.

Figure 2:
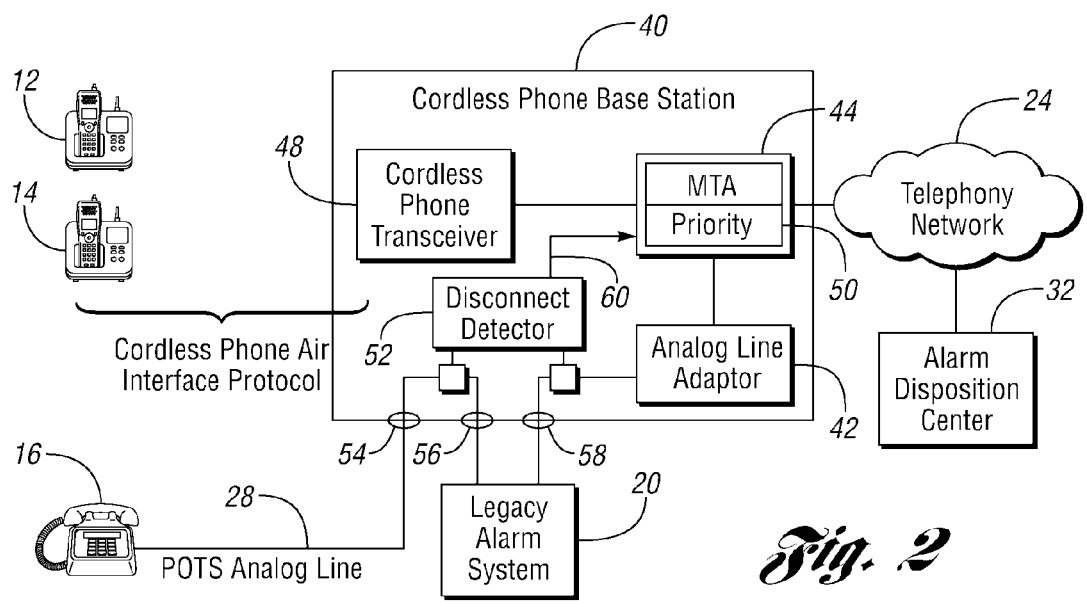
FIG. 2 illustrates a base station including a disconnect connector to facilitate determining a need to transmit an alarm message in accordance with one non-limiting aspect of the present invention.

FIG. 2 illustrates the base station 40 including a disconnect connector 52 to facilitate determining a need to transmit an alarm message in accordance with one non-limiting aspect of the present invention. The base station 40 may include separate ports 54, 56, 58 arranged to support analog interfaces to the POTS phone 16 and the alarm system 20. The ports 54, 56, 58 may be arranged such that a single POTS line 28 is used to connect both of the telephone phone 16 and alarm system 20 to the base station 40. The ports 54, 56, 58 may be configured such that the alarm system 20 is electrically connected in series with the telephone phone 16, thereby allowing the alarm system 20 to seize signaling used to support a phone call through the POTS phone 16. This may include the alarm system 20 physically preventing passage of the POTS phone signals to the base station 40. When the disconnect detector 52 detects the alarm system 20 attempting to seize the telephone line 28, it can report the event to the priority controller 50 by way of an interrupt message transmission line 60.

Upon receiving an interrupt message, the priority controller 50 can then terminate a call to the cordless phone transceiver 48 in the event the cordless phones 12, 14 have all telephony network lines actively engaged in calls. In this way, the base station 40 can pre-empt or disconnect cordless phones as needed to support a call/message transmission from the legacy alarm system 20. In the event the cordless phone 12, 14 was not in use or that other lines are available for use, the priority controller 50 may simply ignore the interrupt message and allow the alarm message to be normally transmitted through one of the available signal paths.

The disconnect detector 52 may be configured to detect disconnect attempts of the alarm system 20 via voltage measurements, impedance measurements, and/or some other representation of the alarm system 20 attempting to prevent a POTS signal from traveling to the base station 40 and/or the alarm system 20 attempting to transmit a signal over the telephone line 28. If the alarm system 20 is of the type that mechanically clamps to the telephone line 28 or otherwise mechanically actuates between different states, e.g., a relay, switch, etc., the disconnect detector 52 may include a sensor (not shown) that can be attached to the mechanically actuated component to assess interrupt attempts according to movement of such a component. While the disconnection detector 52 is shown to be integrated into the base station 40, it may be separate from the base station 40. It may also be wired such that the analog phones 16 are directly connected to the analog line adaptor 42 when the alarm system 20 is plugged into the base station 40.

Figure 3:
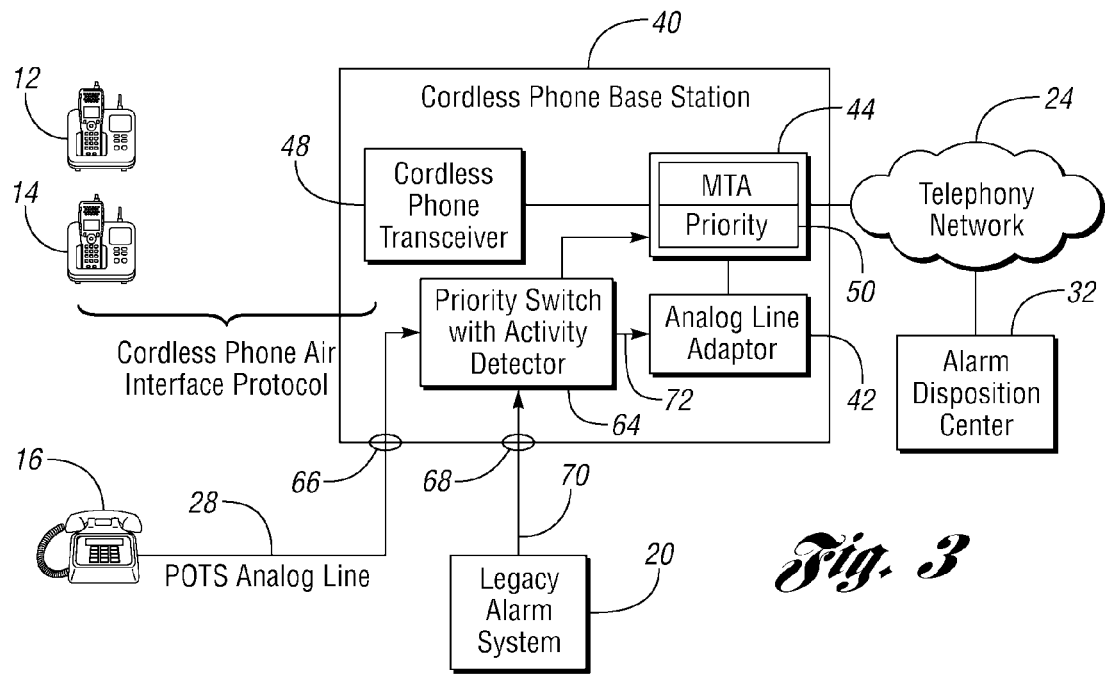
FIG. 3 illustrates the base station including a priority switch to facilitate determining a need to transmit an alarm message in accordance with one non-limiting aspect of the present invention.

FIG. 3 illustrates the base station 40 including a priority switch 64 to facilitate determining a need to transmit an alarm message in accordance with one non-limiting aspect of the present invention. The base station 40 may include separate ports 66, 68 to the telephone 16 and the legacy alarm system 20 to support the use of two POTS telephone lines 28, 70—one for each of the POTS phone 16 and the alarm system 20—and a single port 72 to the analog line adaptor 42. The priority switch 64 may be configured to normally connect the analog phone 16 to the analog line adaptor 42 when the alarm system 20 is idle and to switch connections to the alarm system 20 when the alarm system 20 is active. The priority switch 64 may be configured as a switch that establishes a single connection between the analog line adaptor 42 and one of the analog lines 28, 70. In this manner, the priority switch 64 can simply switch the connection between one of the telephone 16 and alarm system 20, as opposed to requiring the alarm system 20 to interrupt signaling associated with the POTS phone 16.

Unlike the disconnect detector 52 of FIG. 2 where internal operations of the alarm system 20, e.g., those associated with clamping the telephone line, may need to be monitored, the priority switch 64 may be more simply configured to switch the connection to the analog line adaptor 42 upon any messages or signals (change in line voltage) being transmitted over the alarm system port 68. Optionally, in addition to switching the connection and upon detecting activity from the alarm system 20, the priority switch 64 can send an interrupt message to the MTA 44 in order to indicate a need to pre-empt calls from the cordless phone transceiver 48. In this manner, the base station 40 can facilitate interoperability by switching analog connections to the POTS phone 16 and alarm system 20 and by providing corresponding messages to the priory controller 50 to interrupt cordless phone calls if necessary. While the priority switch 64 is shown to be integrated into the base station 40, it may be separately located outside of a housing (not shown) of the base station 40.

Figure 4:
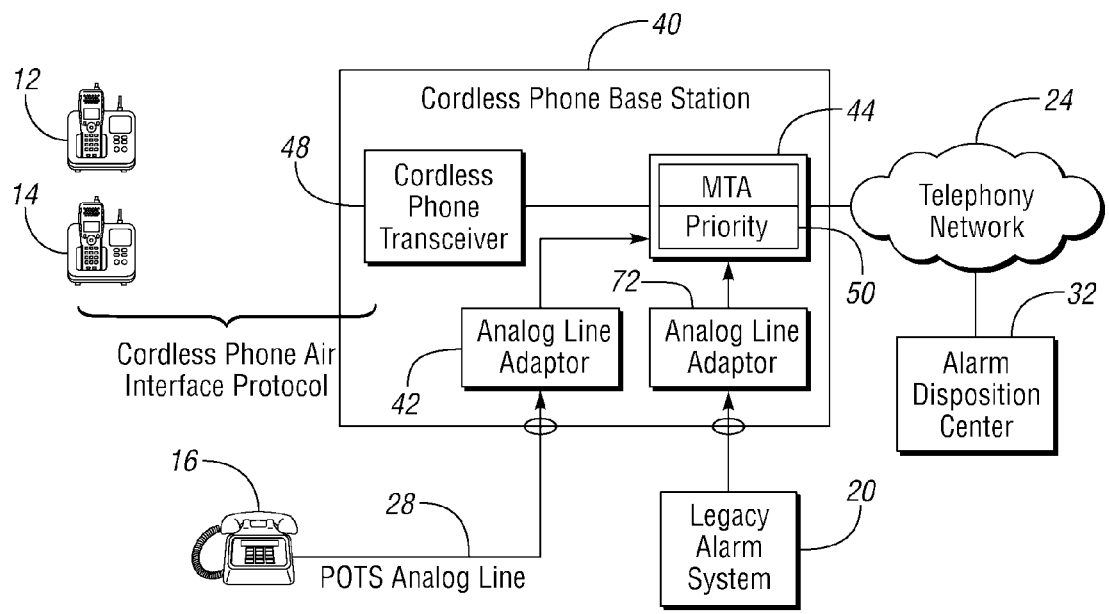
FIG. 4 illustrates the base station including separate analog line adaptors in accordance with one non-limiting aspect of the present invention.

FIG. 4 illustrates the base station 40 including separate analog line adaptors 42, 72 for each of the POTS telephone 16 and the legacy alarm system 20.

The priority controller 50 may be configured to give priority to the analog line adaptor 72 that is assigned exclusively to the legacy alarm system 20, i.e., in the event both analog line adaptors 42, 72 are carrying signals, the adaptor 72 of the alarm system 20 is given priority. In this manner, the MTA 44 can receive phone call requests individually from the cordless phone transceiver 48, the analog line adaptor 42 used for analog phones 16, and the analog line adaptor 72 assigned to the legacy alarm system 20 with call requests from the alarm system 20 taking priority over, and preempting, calls from the cordless phones 12, 14 or analog phones 16. This arrangement can be beneficial since it does not require an interrupt message to be delivered to the priority controller 50.

Figure 5:
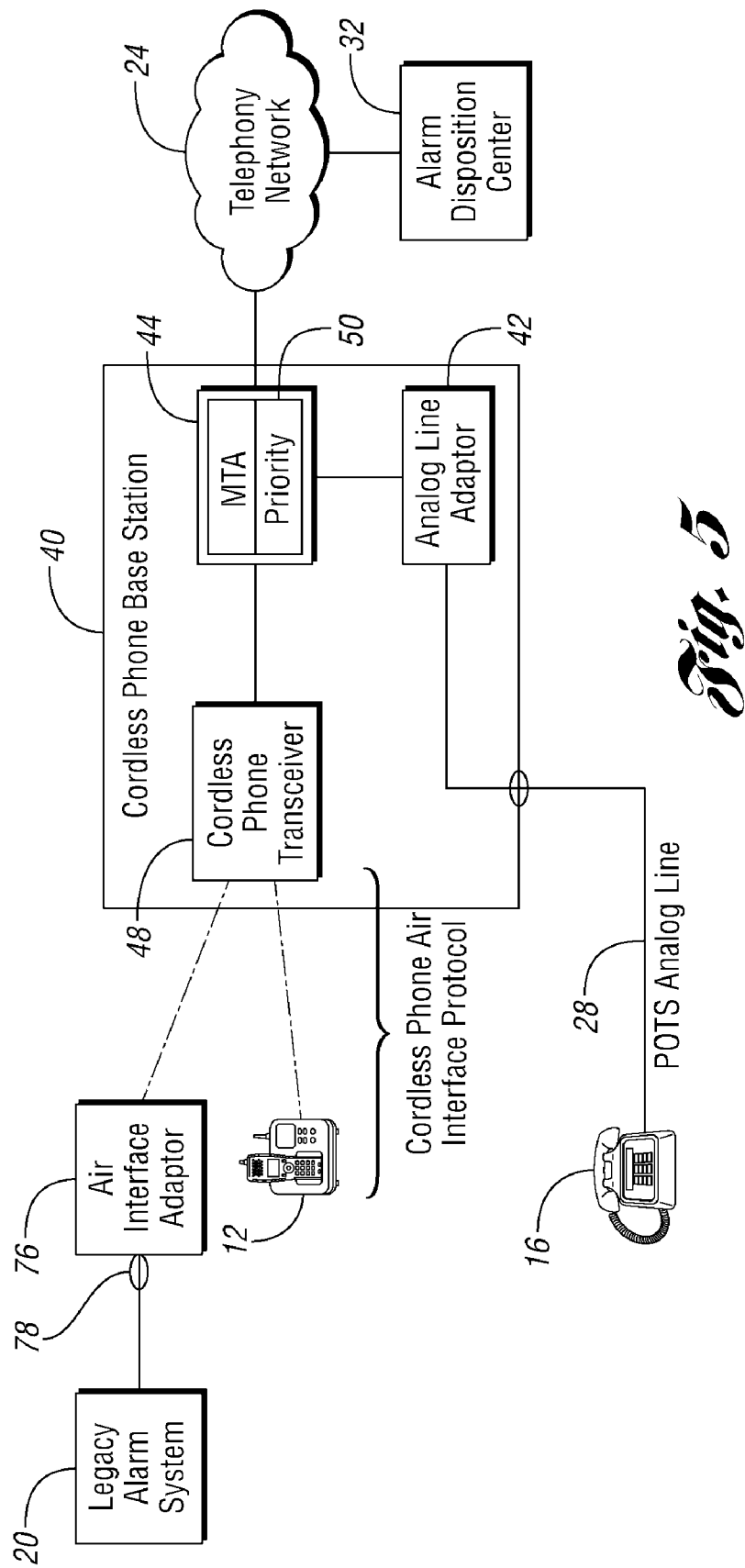
FIG. 5 illustrates the base station including an air interface adaptor in accordance with one non-limiting aspect of the present invention.

FIG. 5 illustrates the use of the base station 40 with an air interface adaptor 76 in accordance with one non-limiting aspect of the present invention. The air interface adaptor 76 provides a cordless phone air interface to support cordless phone communications for the legacy alarm system 20. The air interface adapter 76 may include a standard analog RJ-11 port 78 to connect to the alarm system 20. The air interface adaptor 76 allows the POTS telephone 16 to be connected directly to the base station 40 without the alarm system 20 having any ability to seize the corresponding POTS line 28. When the legacy alarm system 20 detects an alarm, it places a call as it normally does on the analog port 78 to the air interface adaptor 76, which then translates the analog call request to the appropriate cordless phone air interface protocols, such as DECT.

The cordless phone protocol may include a unique identifier for each handset registered on the air interface. The identifier for the legacy alarm system interface adaptor 76 can be passed to the MTA 44 and/or priority controller 50 such that the priority controller 50 can reliably distinguish between an alarm system call request via the air interface adaptor 76 and calls from normal cordless handsets 12, 14. The priority controller 50 can give priority to the legacy alarm system calls based on the air interface adaptor ID and can preempt calls from cordless phones 12 or the POTS phone analog line 28 at the base station as needed to place the alarm system call over the telephony network 24 to the alarm disposition center 32.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A base station for supporting communications over a VoIP network, including communications used to support cordless phone calls, analog phone calls, and transmission of an alarm message from a legacy alarm system, the base station comprising:
   a housing having an output port for exchange signals with the VoIP network and at least one input port for exchanging signals with a cordless phone handset, an analog line, and the legacy alarm system;
   a cordless phone transceiver within the housing, the cordless phone transceiver configured to exchange digital signaling with the cordless phone handset in order to support a cordless phone call;
   an analog line adaptor within the housing, the analog line adaptor configured to convert analog signaling used to support an analog phone call over a plain old telephone system (POTS) phone line into digital signaling;
   a media terminal adaptor (MTA) within the housing, the MTA configured to interface the digital signaling and the alarm messaging from the cordless phone transceiver and the analog line adaptor with the VoIP network according to a prioritization scheme, the prioritization scheme requiring the MTA to interrupt a phone call supported by the cordless phone transceiver upon determining a need for the legacy alarm system to transmit the alarm message over the VoIP network; and
   wherein the MTA determines the need for the legacy alarm system to transmit the alarm message upon receipt of an interrupt message sent from a disconnect detector included within the housing.

2. The base station of claim 1 wherein the disconnect detector sends the interrupt message upon detecting seizure of the POTS phone line by the legacy alarm system.

3. A base station for supporting communications over a VoIP network, including communications used to support cordless phone calls, analog phone calls, and transmission of an alarm message from a legacy alarm system, the base station comprising:

a housing having an output port for exchange signals with the VoIP network and at least one input port for exchanging signals with a cordless phone handset, an analog line, and the legacy alarm system;

a cordless phone transceiver within the housing, the cordless phone transceiver configured to exchange digital signaling with the cordless phone handset in order to support a cordless phone call;

an analog line adaptor within the housing, the analog line adaptor configured to convert analog signaling used to support an analog phone call over a plain old telephone system (POTS) phone line into digital signaling; and a media terminal adaptor (MTA) within the housing, the MTA configured to interface the digital signaling and the alarm messaging from the cordless phone transceiver and the analog line adaptor with the VoIP network according to a prioritization scheme, the prioritization scheme requiring the MTA to interrupt a phone call supported by the cordless phone transceiver upon determining a need for the legacy alarm system to transmit the alarm message over the VoIP network wherein the MTA determines the need for the legacy alarm system to transmit the alarm message upon receipt of an interrupt message sent from a priority switch included within the housing to monitor activity from the legacy alarm system.

4. A base station for supporting communications over a VoIP network, including communications used to support cordless phone calls, analog phone calls, and transmission of an alarm message from a legacy alarm system, the base station comprising:

a housing having an output port for exchange signals with the VoIP network and at least one input port for exchanging signals with a cordless phone handset, an analog line, and the legacy alarm system;

a cordless phone transceiver within the housing, the cordless phone transceiver configured to exchange digital signaling with the cordless phone handset in order to support a cordless phone call;

an analog line adaptor within the housing, the analog line adaptor configured to convert analog signaling used to support an analog phone call over a plain old telephone system (POTS) phone line into digital signaling;

a media terminal adaptor (MTA) within the housing, the MTA configured to interface the digital signaling and the alarm messaging from the cordless phone transceiver and the analog line adaptor with the VoIP network according to a prioritization scheme, the prioritization scheme requiring the MTA to interrupt a phone call supported by the cordless phone transceiver upon determining a need for the legacy alarm system to transmit the alarm message over the VoIP network; and a first port for the cordless phone transceiver, a second port for the POTS phone line, and a third port for the legacy alarm system, wherein the MTA determines the need for the legacy alarm system to transmit the alarm message upon receipt of any signal from the third port.

5. A base station for supporting communications over a VoIP network, including communications used to support cordless phone calls, analog phone calls, and transmission of an alarm message from a legacy alarm system, the base station comprising:

a housing having an output port for exchange signals with the VoIP network and at least one input port for exchanging signals with a cordless phone handset, an analog line, and the legacy alarm system;

a cordless phone transceiver within the housing, the cordless phone transceiver configured to exchange digital signaling with the cordless phone handset in order to support a cordless phone call;

an analog line adaptor within the housing, the analog line adaptor configured to convert analog signaling used to support an analog phone call over a plain old telephone system (POTS) phone line into digital signaling;

a media terminal adaptor (MTA) within the housing, the MTA configured to interface the digital signaling and the alarm messaging from the cordless phone transceiver and the analog line adaptor with the VoIP network according to a prioritization scheme, the prioritization scheme requiring the MTA to interrupt a phone call supported by the cordless phone transceiver upon determining a need for the legacy alarm system to transmit the alarm message over the VoIP network; and wherein the MTA determines the need for the legacy alarm system to transmit the alarm message upon receipt of a message from an air interface adaptor configured to cordlessly communicate the alarm message with the cordless phone transceiver.

6. A base station for interfacing digital and analog telephone calls with a telephony network comprising:

an adaptor configured to interface digital and analog telephone signaling used to support digital and analog telephone calls with the telephony network;

a priority controller in communication with the adaptor, the priority controller configured to pre-empt both digital and analog telephone calls in the event a legacy alarm system needs to transmit an alarm message with the use of analog telephone signaling, the legacy alarm system characterized by an inability to seize the digital telephone signaling;

a cordless phone receiver configured to exchange digital telephone signaling used to support digital phone calls with a cordless phone handset;

a first analog line adaptor configured to exchange analog telephone signaling used to support analog telephone calls with a POTS telephone; and a disconnect detector configured to transmit an interrupt message to the adaptor upon detecting the legacy alarm system attempting seizure of an analog telephone line connected to the POTS telephone, the interrupt message instructing the adaptor as to the need of the legacy alarm system to transmit the alarm message.

7. The base station of claim 6 further comprising an RJ-11 interface between the first analog line adaptor and the POTS telephone.

8. The base station of claim 6 further comprising a priority switch configured to switch the adaptor into communication with one of but not both of the POTS telephone and the legacy alarm system based on upon activity detected from the legacy alarm system.

9. The base station of claim 8 wherein the priority switch is configured to transmit an interrupt message to the adaptor upon detecting activity from the legacy alarm system, the interrupt message instructing the adaptor as to the need of the legacy alarm system to transmit the alarm message.

10. The base station of claim 6 further comprising a second analog line adaptor configured to exchange analog telephone signaling with the legacy alarm system, wherein the adaptor is configured to automatically pre-empt any telephone calls associated with the first analog line adaptor and the cordless phone transceiver upon detecting activity from the second analog line adaptor.

11. A base station for interfacing digital and analog telephone calls with a telephony network comprising:
- an adaptor configured to interface digital and analog telephone signaling used to support digital and analog telephone calls with the telephony network;
- a priority controller in communication with the adaptor, the priority controller configured to pre-empt both digital and analog telephone calls in the event a legacy alarm system needs to transmit an alarm message with the use of analog telephone signaling, the legacy alarm system characterized by an inability to seize the digital telephone signaling;
- a cordless phone receiver configured to exchange digital telephone signaling used to support digital phone calls with a cordless phone handset; and
- wherein the adaptor determines the need for the legacy alarm system to transmit the alarm message upon receipt of information specified with a DECT message received form the cordless phone transceiver.

12. A base station for interfacing digital and analog telephone calls with a telephony network comprising:
- an adaptor configured to interface digital and analog telephone signaling used to support digital and analog telephone calls with the telephony network;
- a priority controller in communication with the adaptor, the priority controller configured to pre-empt both digital and analog telephone calls in the event a legacy alarm system needs to transmit an alarm message with the use of analog telephone signaling, the legacy alarm system characterized by an inability to seize the digital telephone signaling; and
- a detector configured to detect the need of the legacy alarm system to transmit the alarm message based upon sensing mechanical movement of a component used by the legacy alarm system to seize a POTS telephone line used to connect the legacy alarm system to the base station, wherein the detector senses mechanical movement when the component moves between first and second positions.

13. The base station of claim 12 wherein the component prevents signals from a POTS telephone serially connected to the legacy alarm system from reaching the adaptor.

14. A method of supporting interoperability of a legacy alarm system with a digital telephony network, the legacy alarm system being configured to communicate analog alarm messages upon successful seizure of a POTS telephone line, the POTS telephone line being included at a location protected by the legacy alarm system, the location including a base station configured to interface alarm messages and cordless phone calls with the digital telephony network, the method comprising:
- automatically detecting an attempt of the legacy alarm system to seize the POTS telephone line as a function of a sensed operating change in the legacy alarm system, the attempt being determined without requiring the legacy alarm system to transmit a message or to otherwise indicate seizure of the POTS telephone line;
- in the event a cordless phone call is taking a place at the time the attempt of the legacy alarm system to seize the POTS telephone line is detected and the base station is unable to support both the cordless phone call and transmission of an alarm message, automatically interrupting the cordless phone call in order to permit transmission of the alarm message;
- interrupting the cordless phone call according to a predefined priority schedule embedded within the base station; and
- preventing interruption of the cordless phone call if the priority schedule indicates the cordless phone call to have a higher priority than the alarm message.

* * * * *